Dec. 15, 1970
J. B. COCKROFT
3,548,280
CONTROL MEANS FOR BLENDER OR THE LIKE
Filed June 12, 1967
2 Sheets-Sheet 1
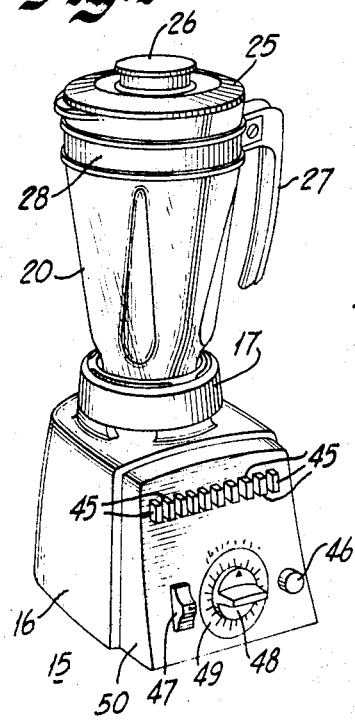
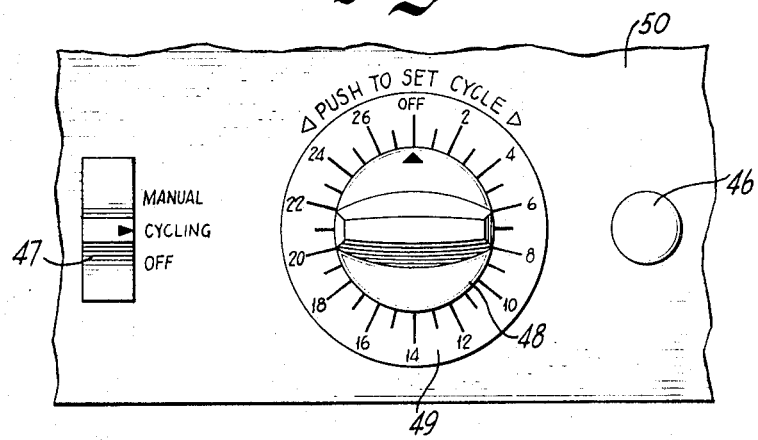
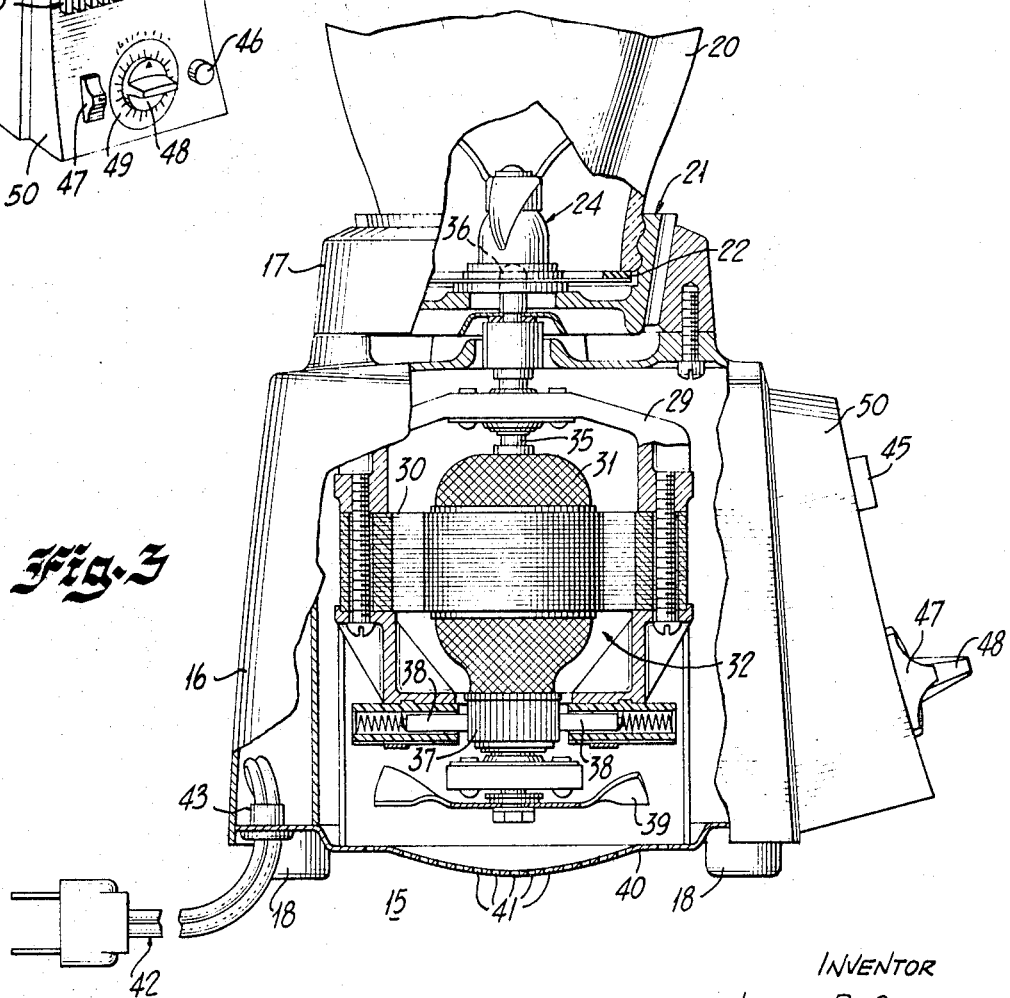
INVENTOR
JAMES B. COCKROFT
by George R. Clark
ATTORNEY United States Patent Office 3,548,280
Patented Dec. 15, 1970

3,548,280
CONTROL MEANS FOR BLENDER OR THE LIKE
James B. Cockroft, Wauwatosa, Wis., assignor to John Oster Manufacturing Co., Milwaukee, Wis., a corporation of Wisconsin
Filed June 12, 1967, Ser. No. 645,330
Int. Cl. H02p 1/00; A47j 43/08
U.S. Cl. 318—443                                        15 Claims

ABSTRACT OF THE DISCLOSURE

Automatic intermittent control for a blender whereby the blender motor may be set to cycle and when so set the motor automatically runs for a brief period, then stops, then runs for a brief period, and so on, over a selected predetermined number of cycles thereby greatly to speed up a chopping or other function performed by the blender. Instead of having the motor intermittently start and stop, the same thing can be accomplished by having the motor intermittently operated at relatively low speeds and then at relatively high speeds.

---

The present invention relates to a blender and more particularly to improved automatic control means for such a blender.

An appliance which has been extensively sold particularly in recent years is commonly termed a blender. The blender actually performs many functions depending upon the speed of the rotating blades which are usually disposed near the bottom of a removable mixing container. A blender may be used for crumbing, chopping, grating, grinding, pureeing, liquefying, blending, whipping and mixing operations, as well as for many purposes. When a blender is operated the liquid or mixture, including solid particles, is rotated at high speed throughout the extent of the mixing vessel. Unless the solid particles return to the bottom adjacent the blades they will not be further chopped, ground etc. It has been found that much of the rotating mass of material does not return to engage the rotating blades and, hence, it is not further liquefied or cut up except upon the lapse of an inordinate amount of time. It has been found that if the blender, after being run for a very short period of time, is shut off and then started again with this periodic or intermittent starting and stopping repeated a number of times, or, instead of stopping and starting, the blender is operated first at high speeds and then at relatively low speeds in an intermittent manner, the mass of rotating material falls down to the knives or rotating cutting means and the chopping or other operation can be performed much more quickly than if such intermittent control is not provided. It would furthermore be desirable to provide automatic means whereby the blender may be set for cycling operation and such intermittent operation either intermittent starting and stopping, or intermittent operation at low and high speeds, will take place over a selected number of cycles which might be ten or twenty cycles of on and off operation or low and high speed operation.

Accordingly, it is an object of the present invention to provide an automatic intermittent control means whereby a blender, or similar device, may be operated not only in the conventional manner to perform its many different functions, but may be set to be automatically turned on and off intermittently, or intermittently operated at two different speeds, to insure the most efficient chopping, blending, liquefying, etc., operation.

It is a further object of the present invention to provide improved control means for accomplishing automatic intermittent operation of a blender.

It is another object of the present invention to provide an improved control means for automatically periodically modifying the energization of a blender motor for a selected predetermined number of cycles to obtain the most efficient operation of the blender.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is a perspective view of a blender incorporating one embodiment of the present invention;

FIG. 2 is an enlarged fragmentary view of a portion of the control panel of the blender of FIG. 1 showing the control knob determining the number of cycles selected in the "OFF" position, the main control knob in the "CYCLING" position and with none of the push buttons controlling the various motor speeds being actuated;

FIG. 3 is an enlarged elevational fragmentary view with certain portions cut away of the blender of FIG. 1 with the controls in position shown in FIG. 2.

Figure 4:
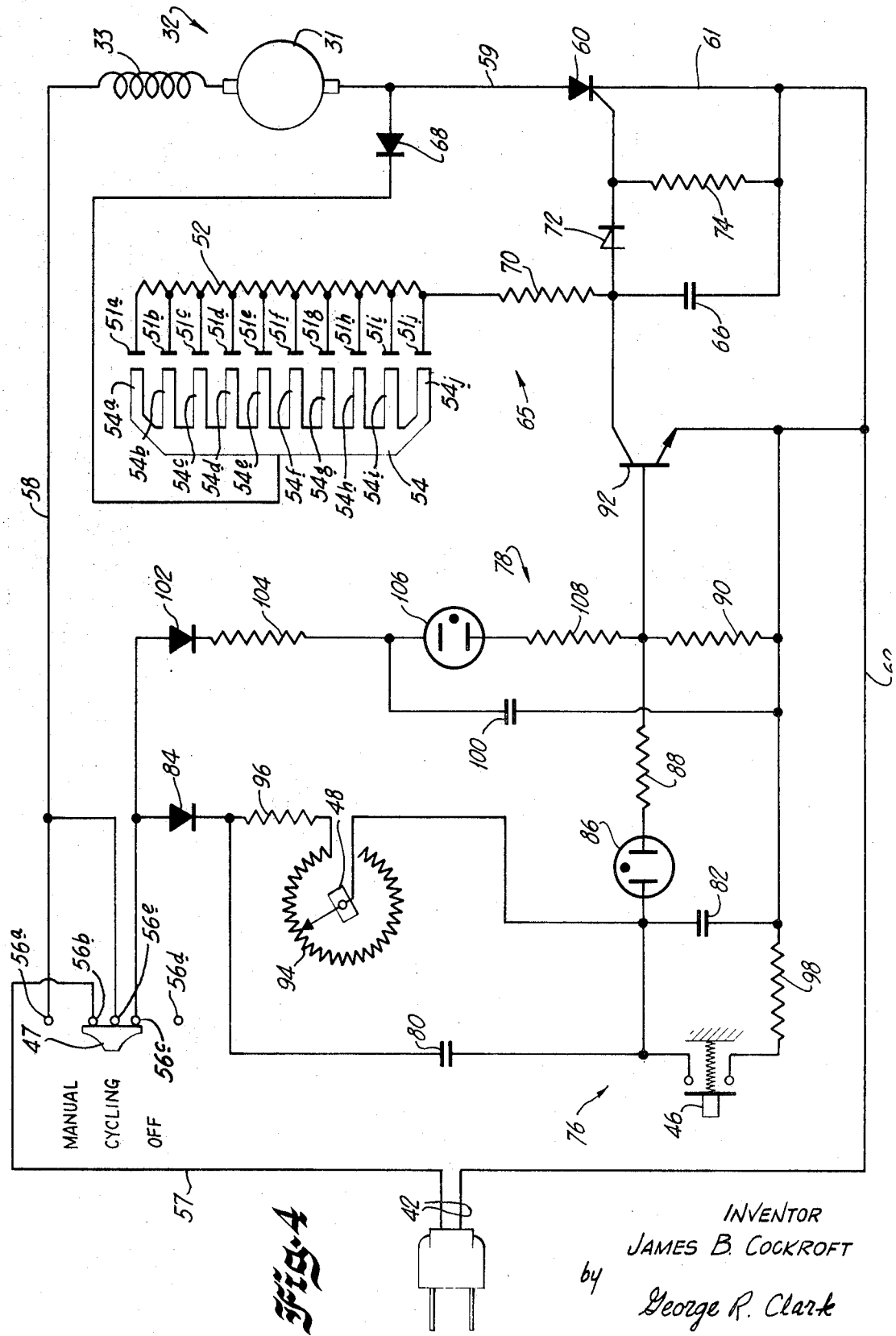
FIG. 4 is a schematic circuit diagram of the blender control of the present invention showing one embodiment of the automatic means for causing intermittent operation of the blender for a selected number of cycles of operation.

Briefly, the present invention is concerned with an automatic intermittent control for a blender effectively to cycle the operation of the blender motor. Much better engagement between the blades and the contents of the blender vessel can be achieved if the motor is alternately turned on and off for short intervals of time for a selected number of cycles of intermittent operation, or if the speed of the motor is intermittently operated at a relatively low speed and at a higher speed. In the embodiment illustrated in the drawings, electronic means are provided to produce the intermittent or periodic control of the blender motor during operation thereof when the device is set for automatic cycling. It should be understood, however, that various means might be employed to provide intermittent or cyclic operation of the blender motor either turning it on or off or causing the speed to be intermittently increased and decreased to accomplish the same purpose, namely, better engagement between the blades and the contents of the blender. In the copending application filed concurrently herewith, Ser. No. 645,331, Lauren O. Main, and also assigned to the same assignee as the instant application, there is disclosed a mechanical arrangement for obtaining such intermittent or periodic control of the blender motor. It should be understood, however, that electrical or thermal means, or combinations of electronic, mechanical, electrical and thermal means, may be employed for causing the cyclic operation of the blender motor either on and off in intermittent cycles or, alternately, at high speed and low speed for a selected number of cycles. It is intended that the present invention is broad enough to cover blender controls for automatic intermittent operation regardless of the specific nature of the means for accomplishing the same.

Referring now to the drawings and more particularly to FIGS. 1 to 3 thereof, there is illustrated a blender incorporating the control means of the present invention, which blender is generally designated by the reference numeral 15. The particular construction of the blender itself aside from the control means forms no part of the present invention but is merely illustrated to include a complete disclosure. As illustrated, the blender unit 15 comprises the conventional base 16 having supported at the top the container holder 17. The base is preferably supported on suitable legs or bumpers 18 (FIG. 3). A suitable container 20 has the bottom thereof closed by a suitable container bottom 21 threaded thereto and making sealing connection therewith by means of the well known diaphragm seal 22. The container bottom supports the conventional agitator assembly 24. Preferably, the top of the container 20 is closed by a suitable top cover 25 which in turn may have a removable filler cap 26. A suitable handle 27 is preferably secured to the container 20 by a flexible strap 28 in a well known fashion.

In order to drive the agitator assembly 24, there is mounted within the base 16 a suitable motor mounting assembly 29 which supports the field structure 30 and the armature 31 of an electric motor generally designated at 32. The field structure 30 preferably includes a field winding 33 schematically shown in FIG. 4 of the drawings. As is best shown in FIG. 3 of the drawings, the armature 31 is mounted on a suitable armature shaft 35 which is adapted to rotate the drive means 36 which may, for example, comprise a square shaft for making releasable driving engagement with the agitator assembly 24. As illustrated, the motor 32 includes a commutator 37 with which conventional spring biased brushes 38 engage.

To insure proper cooling of the motor 32, a suitable fan 39 is secured to the armature shaft 35 so as to be rotatable therewith. Preferably, a base cover 40 closes the bottom of the base 16 and is provided with a plurality of openings 41 to permit cooling air to circulate around the motor structure. A conventional power cord 42 entering the base 16 through a cold bushing 43 insures an electric power supply for energizing the motor 32.

For the purpose of insuring proper operation of the motor 32 to perform the various functions which the blender 15 of the present invention is intended to perform, it has been found desirable to have as many as ten distinct and separate speeds of the motor 32. For example, such a blender when use to stir foods operates at a relatively low speed. The speed should increase slightly when pureeing foods, should increase still more when mixing foods and should become successively higher when the blender is used for chopping, grinding, blending, liquefying and the like. As illustrated in FIG. 1 of the drawings, the blender 15 is provided with a plurality of push buttons 45, ten of them being shown in FIG. 1 of the drawings. The push buttons 45 are all identical and the details form no part of the present invention, but preferably may be identical with the arrangement disclosed and claimed in a copending application of Edwards and Cockroft, Ser. No. 596,962, filed Nov. 25, 1966, now Patent No. 3,420,969 and assigned to the same assignee as the instant application. With such a push button control as will be only briefly described hereinafter, it is desirable to have a master control member which, in accordance with the present invention, is illustrated as a sliding control member 47 capable of assuming three different positions, as is designated in FIGS. 2 and 4 of the drawings, as an uppermost "MANUAL" position, an intermediate "CYCLING" position and a lowermost "OFF" position.

In addition to the push buttons 45 and the sliding control member 47, there is also provided in accordance with the present invention a cycle selecting button 48 which is adapted to be rotated to select a predetermined number of cycles of intermittent operation of the motor 32. Associated with the cycle selector button 48 is a suitable dial 49 which is marked off in cycles from one to twenty-eight, knob 48 being shown in the "OFF" or zero selected number of cycles position setting. The control means of the present invention, as illustrated in FIG. 1 of the drawings, also includes a push button 46, the purpose of which will become more apparent during the ensuing description of the circuit diagram of FIG. 4 of the drawings.

In order to house the push buttons 45 and associated control means, the sliding control member 47, the cycle selector button 48, and the push buttons 46, there is provided a shallow housing or control panel 50 preferably molded from a suitable nonconducting plastic such as a general purpose phenolic resin. The front wall of the control panel is provided with suitable openings to accommodate the push buttons 45 and 46, the main sliding control member 47 and the cycle selector 48. The control panel 50 moreover is adapted to house therein the control means of the electronic control, best shown in FIG. 4 and described in detail hereinafter.

Considering now very briefly the push buttons 45 and associated control mechanism, each push button and associated control mechanism is preferably identical with those described in detail in the copending Edwards and Cockroft application referred to above. Associated with each push button is a stationary contact 51 which, for ten push buttons, as best shown in FIG. 4 of the drawings, are specifically designated as 51a, 51b, 51c, 51d, 51e, 51f, 51g, 51h, 51i and 51j. These stationary contacts are connected to various taps on a speed control resistor 52.

For the purpose of selectively energizing a predetermined tap on the resistor 52 (and consequently selecting a predetermined speed of the blender motor 32) a common contact 54 is provided having a plurality of individual resilient contact fingers 54a to 54j, inclusive. These fingers are associated with the push buttons 45, one finger with each push button. It will readily be apparent that, depending upon which push button is actuated, a particular one of the contacts 51 and consequently a particular tap on the resistor 52 is rendered effective.

Referring now to FIG. 4 of the drawings where the power cord 42, the motor 32, the tapped resistor 52, the master control member 47, the cycle selector button 48 and push button 46 are schematically shown, the sliding master control is adapted to bridge and electrically interconnect adjacent pairs of four contacts designated specifically as 56a, 56b, 56c and 56d. An additional contact 56e, described in more detail hereinafter, is also associated with master control member 47. The contacts 56a and 56b, when bridged by the cyclic control button 47, control manual operation and permit current from power cord 42 to flow through a conductor 57, the switch comprising contacts 56a and 56b, a conductor 58, field winding 33 and the brushes and commutator of the motor 32, a conductor 59, a silicon controlled rectifier 60, a conductor 61, and a conductor 62, back to the other side of the power cord 42. The speed of the motor 32 is controlled in accordance with the firing of the silicon controlled rectifier 60, as described hereinafter, which in turn is controlled by the particular tap on the resistor 52 rendered effective by virtue of one of the push buttons 45.

More specifically, with the contacts 56a and 56b connected by the control member 47, the motor 32 is connected across the input line in series with the silicon controlled rectifier 60. The speed at which the motor 32 is operated is selectively controlled by a speed control circuit, indicated generally as 65, which includes the speed control resistance means 52. The alternating current input signal provided from the input line selectively charges a capacitor 66 over a circuit including a diode or rectifier 68, the portion of the speed control resistance 52 selected by the depressed one of the push buttons 45, and a resistor 70. After a time delay in each positive-going excursion of the alternating current input signal determined by the selected portion of the speed control resistance 52, the capacitor 66 is charged to the breakdown potential of a trigger diode 72. At this time, the diode 72 is placed in a conductive condition to discharge the capacitor 66 into the gate electrode of the silicon controlled rectifier 60 and a shunting resistance 74 to supply gate current for the rectifier 60. At this time, the rectifier 60 is placed in a conductive condition for the remaining portion of the cycle to energize the motor 32. Since the time required to reach the breakover potential of the trigger diode 72 can be varied by selecting different taps on the resistance 52, the proportion of each cycle during which the motor 52 is energized, and thus the speed of operation of the motor 32, can be controlled.

The control circuit for the blender also includes a timing control circuit, indicated generally as 76, for controlling the length of time that the motor 32 is operated at the speed selected by the depressed push button 45 and an additional "chop" control circuit, indicated generally as 78, for intermittently energizing the motor 32 at the speed selected by the depressed push button 45, and, if desired, for the time interval selected by the control circuit 76. As indicated above, this intermittent energization of the motor 32 permits the contents of the receptacle 20 to settle back to a position in intimate contact with the comminuting or agitator means 24. The timing circuit 76 permits the blender 15 to be operated for the period of time required to produce the desired blending without requiring the constant attendance of the operator. The control circuits 76 and 78, as well as the control circuit 65, are rendered effective by shifting the master control member 47 to the cycling position illustrated in FIG. 4 in which the three contacts 56b, 56c and 56e are electrically interconnected.

Referring now more specifically to the operation of the control circuit 76, when the blender 15 is connected to external power, a pair of capacitors 80 and 82 are connected in series across the input line through a diode or rectifier 84 so that both of the capacitors 80 and 82 become substantially instantaneously charged. A network including a gaseous discharge device, such as a neon lamp 86, and a pair of resistance elements 88 and 90 are connected in parallel with the capacitor 82. When the capacitor 82 is fully charged, the ionizing potential of the neon lamp 86 is exceeded, and this lamp breaks down and discharges the capacitor 82 through the resistance elements 88 and 90. The potential drop across the resistance element 90, which is connected to the base of a transistor 92, drives the base of this transistor positive with respect to its emitter electrode and places this transistor in a conductive state to provide a low impedance shunt across the capacitor 66. This prevents the charging of the capacitor 66, prevents a flow of gate current in the silicon controlled rectifier 60, and prevents the energization of the motor 32 even though the control circuit 65 is energized over the circuit including electrically interconnected contacts 56b and 56c when the main control member 47 is in its cycling setting. Thus, the blender 15 is not placed in operation at this time.

The control circuit 76 is then adjusted to a setting representing the period of time that the blender 15 is to be operated by adjusting the cycle selector element 48 to a predetermined position in which a selected portion of a variable resistance element 94 is connected in series with the capacitor 82 through a fixed value resistance element 96. The path including the resistance elements 94 and 96 supplies sufficient potential to maintain the neon lamp 86 in an energized condition, affording a positive bias for the base of the transistor 92 to maintain this transistor in a conductive state.

When the timing interval is to be initiated, the push button 46 is momentarily depressed to connect a low value resistance element 98 in parallel with the capacitor 82 and in series with the capacitor 80. Thus, the capacitor 80 quickly charges through the rectifier 84 over the low impedance path including the resistor 98, and the capacitor 82 is substantially discharged through the resistance element 98. The charging of the capacitor 80 and the discharging of the capacitor 82 deprives the neon lamp 86 of sustaining potential, and this lamp returns to a nonconductive or high impedance state, thus removing the enabling bias from the base of the transistor 92. Accordingly, the transistor 92 returns to a nonconductive state, and the capacitor 66 is periodically charged and discharged in the manner described above so that the motor 32 is periodically or intermittently energized to operate the blender 15 at the desired speed.

When the push button 46 is released, the capacitor 80 being substantialy fully charged, the capacitor 82 begins to charge over the circuit including the rectifier 84 and the resistance elements 94 and 96. The time required to charge the capacitor 82 to the point at which the ionizing potential of the neon lamp 86 is reached is determined by the value of the adjustable resistance element 94. During the interval required to charge the capacitor 82 to the ionizing potential of the neon lamp 86, the transistor 92 is held in a nonconductive state, and the control circuit 65 operates in the manner described above to operate the motor 32 at the desired preselected speed. At the end of the time interval required to charge the capacitor 82, the neon lamp 86 is placed in a conductive state and held in a conductive state in the manner described above so that the transistor 92 is held in a conductive state to shunt the charging circuit for the capacitor 66 in the control circuit 65. Thus, operation of the motor 32 terminates at the time the neon lamp 86 is again ionized.

The capacitor 80 in the timing control circuit 76 provides means for insuring that the blender 15 cannot be inadvertently operated with the possibility of injury to the operater when the blender 15 is plugged into a wall receptacle with the main control 47 in its cycling position. More specifically, if the main control element 47 is left in the cycling position, illustrated in FIG. 4, and the blender 15 is connected to a power source, the absence of the capacitor 80 in the control circuit 76 would mean that the capacitor 82 would have to charge slowly over the relatively high impedance circuit including the resistance elements 94 and 96. Thus, the neon lamp 86 would not be immediately ionized, and the speed control circuit 65 would be effective to energize the motor 32. Accordingly, the blender 15 would be placed in operation immediately upon its connection to a source of alternating current power. By the provision of the capacitor 80 shunting the resistance elements 94 and 96, a very low impedance path for charging the capacitor 82 is provided, and the capacitors 80 and 82 become immediately charged upon connecting the blender 15 to power with the main control element 47 in the illustrated cycling position. Since the capacitor 82 is immediately charged, the neon lamp 86 is immediately ionized to place the transistor 92 in a conductive condition, and the speed control circuit 65 is immediately disabled. As described above, the speed control circuit 65 then cannot be placed in operation without a deliberate operation of the push button 46 by the operator.

During the timing interval, the control circuit 78 is effective to modulate the control exercised by the circuit 65 so that the motor 32 can be energized for, for instance, a several second period followed by a several second period during which it is not energized. The "chop" control circuit 78 includes a capacitor 100 that is charged from the input potential over a circuit including a rectifier 102 and a fixed resistance element 104. When the capacitor 100 is charged to the ionizing potential of a neon lamp 106, this lamp is ionized, and the capacitor 100 is discharged through the lamp 106 and a circuit including a resistance element 108 and the resistance element 90. The discharge current of the capacitor 100 provides a positively directed signal across the resistor 90 applied to the base of the transistor 92 to place this transistor in a conductive condition that shunts the charging circuit for the timing capacitor 66 in the control circuit 65. Thus, during this interval, the motor 32 cannot be energized.

When the capacitor 100 is fully discharged, or is discharged below the sustaining potential of the lamp 106, the lamp 106 returns to a high impedance state and the capacitor 100 again is charged through the rectifier 102. At the termination of conduction through the lamp 106, the enabling bias is removed from the base of the transistor 92, the shunt is removed from the timing capacitor 66, and the control circuit 65 is effective to operate the motor 32 at the selected speed. This operation continues until such time as the neon lamp 86 is energized to hold the transistor 92 in a conductive state and disable the motor speed control circuit 65.

The duration of the on and off periods, or the periods during which the transistor 92 is in a conductive and nonconductive condition, are generally fixed by a factory adjustment of, or selection of, the value of the RC time constants for charging and discharging circuits for the capacitor 100. However, the control circuit 78 can be constructed including variable resistance elements in place of the fixed resistance elements 104 and 108 to provide means for controlling the on and off times, respectively, of the motor control circuit 65.

Although the control circuit, shown in FIG. 4 of the drawings, can be fabricated with components of many different values and types, in accordance with the desired circuit application, one control circuit, which was successfully built and tested, used the folllowing components:

| | |
|---|---|
| Capacitor 66 | 0.1 microfarad. |
| Capacitor 80 | 5 microfarads. |
| Capacitor 82 | 5 microfarads. |
| Capacitor 100 | 1 microfarad. |
| Resistor 70 | 22,000 ohms. |
| Resistor 74 | 150 ohms. |
| Resistor 88 | 1,000,000 ohms. |
| Resistor 90 | Vanes in dependence or gain of transistor 92. |
| Resistor 94 | 1,500,000 ohms. |
| Resistor 96 | 150,000 ohms. |
| Resistor 98 | 150 ohms. |
| Resistor 104 | 3,300,000 ohms. |
| Resistor 108 | 1,000,000 ohms. |

It will be understood that thermal means, mechanical means, or other suitable means, may be employed to obtain the blender operation described above. Thus, while there has been shown and described a particular embodiment of the present invention, it will be understood that various changes and modifications of the invention will occur to those skilled in the art and it is intended in the appended claims to cover all such changes and modifications as fall within the true spirit and scope of the present invention.

What is claimed and desired to be secured by Letters Patent of the United States is:

1. An electric blender of the type having means defining a chamber and rotating cutting means disposed within said chamber adjacent the bottom thereof comprising an electric motor for actuating said cutting means, means for energizing said motor, speed control means for selectively operating said motor at a plurality of different speeds, means for automatically and intermittently modifying the energization of said motor at any selected speed whereby said motor is operated in a cyclic manner at the selected speed to permit material in said chamber to settle towards the bottom of said chamber, and means for selectively determining the number of cycles of intermittent operation of said motor.

2. An electric blender of the type having means defining a chamber and rotating cutting means disposed within said chamber adjacent the bottom thereof comprising an electric motor for rotating said cutting means, means for energizing said motor, speed control means for selectively operating said motor at a plurality of different speeds, means for automatically and intermittently modifying the energization of said motor at any selected speed whereby changes in speed of said motor result in a cyclic manner to permit material in said chamber to settle towards the bottom of said chamber, means for selectively determining the number of cycles of intermittent operation of said motor, and means for automatically deenergizing said motor at the end of said selected number of cycles.

3. In an electric blender of the type having means defining a chamber and rotating cutting means disposed within said chamber adjacent the bottom thereof, an electric motor for powering said blender, switch means for energizing said motor, means for selectively operating said motor at a plurality of different speeds, and means for automatically and periodically modifying the energization of said motor to cause said motor alternately to start and stop in cyclic fashion to permit material in said chamber to settle towards the bottom of said chamber, means for selectively determining the number of start-stop cycles of said motor, and means for deenergizing said motor at the end of said selected number of cycles.

4. In an electric blender of the type having means defining a chamber and rotating cutting means disposed within said chamber adjacent the bottom thereof, an electric motor for driving said cutting means, first circuit means including switch means for energizing said motor, means for selectively controlling the speed of said motor, second circuit means for automatically and periodically modifying the energization of said motor to cause said motor alternately to start and stop in cyclic fashion to permit material in said chamber to settle towards the bottom of said chamber, third circuit means for selectively determining the number cycles of starting and stopping of said motor, and fourth circuit means for insuring deenergization of said motor at the end of said selected number of cycles.

5. An electric blender of the type having means defining a chamber and rotating cutting means disposed within said chamber adjacent the bottom thereof, comprising an electric motor drivingly connected to said cutting means, means for energizing said motor, means for selectively operating said motor either continuously or in an intermittent manner with said motor alternately energized and deenergized, to permit material in said chamber to settle towards the bottom of said chamber, and means for selectively determining the number of cycles of intermittent operation of said motor.

6. An electric blender of the type having means defining a chamber and rotating cutting means disposed within said chamber adjacent the bottom thereof, comprising an electric motor drivingly connected to said cutting means, means for energizing said motor, means for selectively operating said motor at a plurality of different speeds, means for selectively operating said motor at any of said speeds either continuously or in an intermittent manner with said motor alternately energized and deenergized to permit material in said chamber to settle towards the bottom of said chamber, means for selectively determining the number of cycles of intermittent operation of said motor, and means for automatically deenergizing said motor at the end of said selected number of cycles.

7. In an electric blender of the type having a chamber and rotating cutting means disposed within said chamber adjacent the bottom thereof, an electric motor for powering said cutting means, means for selectively energizing said motor either for continuous operation or for successive periods of energization and deenergization to permit material in said chamber to settle towards the bottom of said chamber, means for selectively controlling the speed of said motor regardless of the condition of said first mentioned means, means for selectively determining the number of cycles of energization and deenergization of said motor at any of said selected speeds when said first mentioned means is set for successive periods of energization and deenergization of said motor, and means for automatically terminating the cyclic operation of said motor at the end of said selected number of cycles.

8. In an electric blender of the type having a chamber and a rotating cutter disposed within said chamber adjacent the bottom thereof, an electric motor for powering said cutter, means for selectively energizing said motor either for continuous operation or for succesive periods of energization and deenergization, a speed control circuit for selectively controlling the speed of said motor regardless of the condition of said first mentioned means, a chop control circuit for turning said motor on and off in cyclic manner when said first mentioned means is set for successive periods of energization and deenergization of said motor to permit material in said chamber to settle towards the bottom of said chamber, a timing circuit for timing the interval of cyclic operation of said motor, and means for automatically terminating the cyclic operation of said motor at the end of a selected interval.

9. The electric blender of claim 7 wherein said means for selectively controlling the speed of said motor comprises a tapped impedance and a plurality of push buttons for rendering effective any particular tap on said impedance.

10. In an electric blender, an electric motor for powering said blender, first means for selectively energizing said motor either for continuous operation or for succesive periods of energization and deenergization, second means comprising a tapped impedance and a plurality of push buttons for rendering effective any particular tap on said impedance for selectively controlling the speed of said motor regardless of the condition of said first means, third means for selectively determining the number of cycles of energization and deenergization of said motor at any of said selected speeds when said first mentioned means is set for successive periods of energization and deenergization of said motor, said third means comprising an adjustable resistor, a pair of serially connected capacitors and a switch means for momentarily discharging one of said capacitors, and means for automatically terminating the cyclic operation of said motor at the end of said selected number of cycles.

11. The appliance of claim 10 wherein said means for automatically terminating the cyclic operation of said motor at the end of said selected number of cycles comprises circuit means including a neon lamp and a transistor.

12. The electric blender of claim 8 wherein said speed control circuit comprises a silicon controlled rectifier and a trigger diode for controlling said rectifier.

13. In an electric appliance, an electric motor for powering said appliance, means for selectively energizing said motor either for continuous operation or for successive periods of energization and deenergization, a speed control circuit for selectively controlling the speed of said motor regardless of the condition of said first mentioned means, a chop control circuit for turning said motor on and off in cyclic manner when said first mentioned means is set for successive periods of energization and deenergization of said motor, said chop control circuit comprising a series circuit including a neon lamp and a voltage divider, and a capacitor connected in parallel with said series circuit, a timing circuit for timing the interval of cyclic operation of said motor, and means for automatically terminating the cyclic operation of said motor at the end of a selected interval.

14. In an electric appliance, an electric motor for powering said appliance, means for selectively energizing said motor either for continuous operation or for successive periods of energization and deenergization, a speed control circuit for selectively controlling the speed of said motor regardless of the condition of said first mentioned means, a chop control circuit for turning said motor on and off in cyclic manner when said first mentioned means is set for successive periods of energization and deenergization of said motor, a timing circuit comprising a neon lamp and a transistor for timing the interval of cyclic operation of said motor, and means for automatically terminating cyclic operation of said motor at the end of a selected interval.

15. The electric blender of claim 1 wherein electronic means are employed for intermittently modifying the energization of said motor.

References Cited
UNITED STATES PATENTS

| | | | |
|---|---|---|---|
| 2,912,633 | 11/1959 | Nebinger et al. | 307—141X |
| 3,143,395 | 8/1964 | Milmore | 318—164X |
| 3,325,657 | 6/1967 | Corey | 307—141X |
| 3,333,175 | 7/1967 | Klyce | 318—487 |

FOREIGN PATENTS

| | | | |
|---|---|---|---|
| 1,141,072 | 3/1957 | France | 259—108 |

ORIS L. RADER, Primary Examiner

R. J. HICKEY, Assistant Examiner

U.S. Cl. X.R.

259—108